US012109793B2

(12) United States Patent
Holland et al.

(10) Patent No.: US 12,109,793 B2
(45) Date of Patent: Oct. 8, 2024

(54) COMPOSITE SKINS HAVING VARIABLE HOLE SIZES AND SHAPES FORMED USING PHOTOMACHINING

(71) Applicant: UNITED TECHNOLOGIES CORPORATION, Farmington, CT (US)

(72) Inventors: Brian Kenneth Holland, Mason, MI (US); Bruce L Morin, Longmeadow, MA (US); Michael Joseph Murphy, Windsor, CT (US); Steven H. Zysman, Amston, CT (US)

(73) Assignee: RTX CORPORATION, Farmington, CT (US)

( * ) Notice: Subject to any disclaimer, the term of this patent is extended or adjusted under 35 U.S.C. 154(b) by 198 days.

(21) Appl. No.: 16/690,519

(22) Filed: Nov. 21, 2019

(65) Prior Publication Data

US 2021/0158792 A1    May 27, 2021

(51) Int. Cl.
*B32B 38/10* (2006.01)
*B24C 1/04* (2006.01)
*B32B 3/12* (2006.01)
*B32B 3/26* (2006.01)
*B32B 5/02* (2006.01)
(Continued)

(52) U.S. Cl.
CPC .............. *B32B 38/10* (2013.01); *B24C 1/045* (2013.01); *B32B 3/12* (2013.01); *B32B 3/266* (2013.01); *B32B 5/02* (2013.01); *B32B 37/146* (2013.01); *B32B 37/18* (2013.01); *G10K 11/168* (2013.01); *B32B 2262/101* (2013.01);
(Continued)

(58) Field of Classification Search
CPC ......... B32B 3/12; B32B 37/146; B32B 37/18; B32B 2305/02; B32B 2305/024; B32B 38/10; B32B 2315/00; B32B 2038/047; B32B 3/266; B64C 1/045; B64C 1/40; B29C 66/7254; B29C 66/72525; B29C 66/02242; B64D 33/02; B64D 29/00; B64D 2033/0206; F01D 25/24; F02K 1/827; G10K 11/168
USPC ....................................................... 181/292
See application file for complete search history.

(56) References Cited

U.S. PATENT DOCUMENTS 4,612,737 A * 9/1986 Adee .................... G10K 11/172
451/29
5,366,177 A   11/1994 DeCoux
(Continued)

FOREIGN PATENT DOCUMENTS

WO    WO-2014143290 A1 * 9/2014 ............. F01D 25/24
WO    2016144331       9/2016
WO    2016164043       10/2016

OTHER PUBLICATIONS

European Patent Office, European Search Report dated Apr. 21, 2021 in Application No. 20208557.7.
(Continued)

*Primary Examiner* — John L Goff, II
(74) *Attorney, Agent, or Firm* — SNELL & WILMER L.L.P.

(57) ABSTRACT

A face skin for an acoustic panel may comprise a sheet defining a first surface and a second surface. A plurality of slots may be formed through the face skin using abrasive blasting. Each slot of the plurality of slots may comprise a first semi-circular wall and a second semi-circular wall opposite the first semi-circular wall.

14 Claims, 8 Drawing Sheets

(51) Int. Cl.
  *B32B 37/14* (2006.01)
  *B32B 37/18* (2006.01)
  *G10K 11/168* (2006.01)

(52) U.S. Cl.
  CPC ..... *B32B 2262/106* (2013.01); *B32B 2305/02* (2013.01); *B32B 2315/00* (2013.01); *B32B 2419/04* (2013.01)

(56) References Cited

U.S. PATENT DOCUMENTS

| | | |
|---|---|---|
| 6,827,180 B2 | 12/2004 | Wilson et al. |
| 7,152,829 B2 | 12/2006 | Bertolotti |
| 8,701,822 B2 * | 4/2014 | Bouty .................... F02K 1/827 |
| | | 181/224 |
| 10,370,090 B2 | 8/2019 | Koppelman et al. |
| 2010/0133378 A1 * | 6/2010 | Lidoine .................... F02C 7/24 |
| | | 244/1 N |
| 2015/0267593 A1 * | 9/2015 | Lauder .................... B23C 3/00 |
| | | 181/214 |
| 2016/0017732 A1 * | 1/2016 | Thomas ................ F01D 5/141 |
| | | 415/208.1 |
| 2018/0029719 A1 * | 2/2018 | Follet ........................ B64F 5/10 |
| 2018/0257196 A1 * | 9/2018 | Simpson .................... B32B 3/12 |
| 2019/0337632 A1 * | 11/2019 | Berry ........................ F02C 7/24 |
| 2020/0347785 A1 * | 11/2020 | Morin .................... F02K 1/827 |

OTHER PUBLICATIONS

European Patent Office, European Office Action dated Jul. 24, 2024 in Application No. 20208557.7.

* cited by examiner

COMPOSITE SKINS HAVING VARIABLE HOLE SIZES AND SHAPES FORMED USING PHOTOMACHINING

FIELD

The present disclosure relates generally to structural noise suppression systems and, more particularly, to acoustic panels used to suppress noise in aircraft gas turbine engine systems.

BACKGROUND

Acoustic panels may be used for noise suppression in aerospace applications and other fields. The panels typically comprise two skin surfaces that sandwich between them at least one layer of a core material or structure. The two skins and the core structure may be bonded together or cured or otherwise formed together, but mechanical fastening is also used in some applications. The core structure ties the skins together structurally and can form a very rigid, efficient and lightweight structure for noise suppression useful in aerospace applications. The panels may be given acoustic properties by perforating one skin. This enables the cells of the core structure to act like individual Helmholtz resonators that attenuate a certain tone or tones, at specific frequencies or wavelengths, of noise generated by an engine. Current perforated skins generally have fixed hole sizes created by drilling or pin molding. In aerospace applications, nacelles that house turbofan gas turbine engines may use acoustic panels to form the inner barrel of the inlet, the inner fixed structure of a thrust reverser, the translating sleeve of a translating sleeve type thrust reverser, or portions of the exhaust system.

SUMMARY

A face skin for an acoustic panel is disclosed herein. In accordance with various embodiments, the face skin may comprise a sheet defining a first surface and a second surface and a plurality of slots extending from the first surface to the second surface. Each slot of the plurality of slots may be defined by, at least, a first semi-circular wall and a second semi-circular wall opposite the first semi-circular wall.

In various embodiments, a first region of the fiber reinforced composite material may comprise a greater percentage of open area as compared to a second region of the fiber reinforced composite material.

In various embodiments, the first region of the face skin may comprise a greater number of slots of the plurality of slots as compared to the second region.

In various embodiments, a ratio of a length of a first slot of the plurality of slots to a width of the first slot may be between 2:1 and 10:1. In various embodiments, a ratio of the length the first slot to a radius of the first semi-circular wall of the first slot is about 2:1.

In various embodiments, the sheet may comprise a fiber reinforced composite material. In various embodiments, the fiber reinforced composite material may comprise at least one of a fiberglass reinforced composite or a carbon fiber reinforced composite.

A method of fabricating a face skin for an acoustic panel is also disclosed herein. In accordance with various embodiments, the method may comprise locating a masking film over a first surface of a sheet, forming a plurality of slots in the sheet using abrasive blasting, and removing the masking film. The masking film may define a plurality of openings.

In various embodiments, the method may further comprise determining a pattern of the plurality of openings in the masking film based on an airflow velocity experienced by the face skin.

In various embodiments, determining the pattern of the plurality of openings in the masking film based on the airflow velocity experienced by the face skin may comprise forming a first region of the sheet having a greater percentage of open area as compared to a second region of the sheet.

In various embodiments, forming the first region of the sheet having the greater percentage of open area as compared to the second region of the sheet may comprise forming the first region of the sheet having a greater number of slots of the plurality of slots per unit area as compared to the second region.

In various embodiments, the airflow velocity in the first region may be different from the airflow velocity in the second region. In various embodiments, the sheet comprises a fiber reinforced composite material.

In various embodiments, the method may further comprise forming each slot of the plurality of slots having a first semi-circular wall and a second semi-circular wall opposite the first semi-circular wall.

A method of fabricating an acoustic panel is also disclosed herein. In accordance with various embodiments, the method may comprise locating a masking film over a face skin, forming a plurality of slots in the face skin using abrasive blasting, removing the masking film, and coupling the face skin to a core structure. The masking film may define a plurality of openings. The core structure may define a plurality of cells.

In various embodiments, the method may further comprise coupling a back skin to the core structure opposite the face skin. The back skin may be a solid layer. In various embodiments, the face skin may comprise a fiber reinforced composite material.

In various embodiments, the method may further comprise determining a pattern of the plurality of openings in the masking film based on an airflow velocity experienced by the face skin.

In various embodiments, the method may further comprise forming a first region of the face skin having a greater percentage of open area as compared to a second region of the face skin.

In various embodiments, the method may further comprise forming the first region of the face skin having a greater number of slots of the plurality of slots as compared to the second region.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
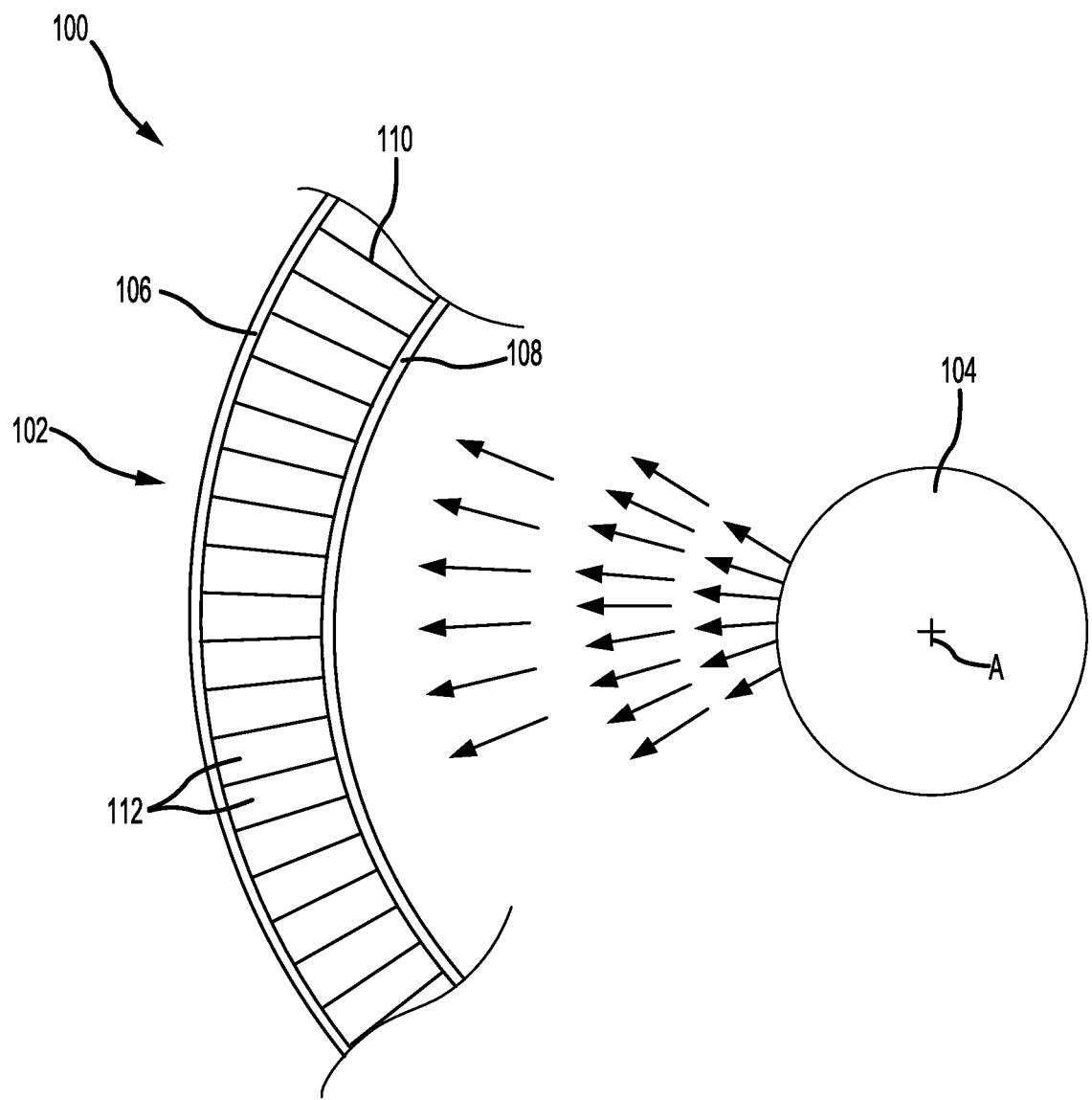
FIG. 1 illustrates a partial sectional view of an acoustic panel located near a noise source, in accordance with various embodiments.

Referring to FIG. 1, a partial sectional view of a noise suppression system 100 is illustrated. The noise suppression system 100 includes an acoustic panel 102 configured for positioning proximate a noise source 104. The acoustic panel 102 includes a back skin 106, a face skin 108, and a core structure 110 sandwiched between the back skin 106 and the face skin 108. Face skin 108 is oriented toward and/or is generally closer to the noise source, as compared to back skin 106. In this regard, face skin 108 generally defines an airflow surface (i.e., the air flowing into, around, through, and/or out the gas turbine engine, may flow along face skin 108). The core structure 110 typically includes a plurality of cells, or plenums, 112 extending between the back skin 106 and the face skin 108. Each of the plurality of cells 112 of the core structure 110 forms a hollow cavity that acts as or similar to a Helmholtz resonator to attenuate noise. Accordingly, noise generated by the noise source 104 enters the core structure 110 through the face skin 108 and is attenuated. Acoustic panel 102 may be formed around a center axis A of noise source 104. The noise source 104 may be, for example, a gas turbine engine for an aircraft and the acoustic panel 102 may be a portion of a nacelle that surrounds the engine or an inlet to the engine. Center axis A may be an central longitudinal axis of the gas turbine engine. In various embodiments, the acoustic panel 102 may be a portion of the inner fixed structure of a thrust reverser, a portion of the translating sleeve of a translating sleeve type thrust reverser, or a portion of an exhaust system for the gas turbine engine.

Although the acoustic panel 102, as illustrated, is positioned radially outward of the noise source 104 and extending a circumferential arc length from one end to the other, the acoustic panel 102 is not limited to the position or arc length shown. For example, the acoustic panel 102 may form a cylindrical shape that surrounds the noise source 104 and/or noise source 104 may be radially outward from acoustic panel. While acoustic panel 102 is illustrated with cells 112 extending between the face skin 108 and the back skin 106, in various embodiments, acoustic panel 102 may include one or more septum(s) within each of the plurality of cells 112. The septum(s) may be a solid or perforated layer.

Figure 2:
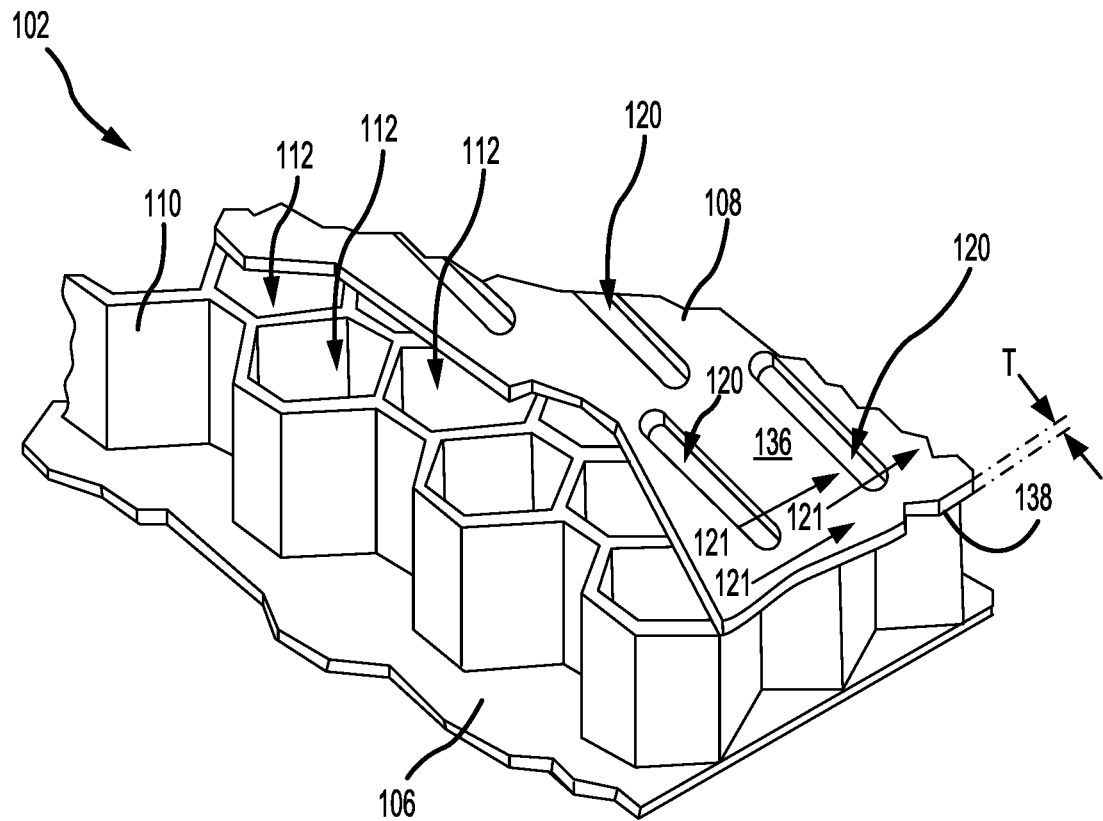
FIG. 2 illustrates a perspective view, partially cutaway, of an acoustic panel, in accordance with various embodiments.

Referring now to FIG. 2, a partially cutaway perspective view of acoustic panel 102 is illustrated. In accordance with various embodiments, core structure 110 is disposed between back skin 106 and face skin 108. In various embodiments, the core structure 110 may have a honeycomb structure. While core structure 110 is illustrated as defining cells 112 having hexagonal cross-sections, it is further contemplated and understood that cells 112 may be formed having any desired cross-sectional shape, such as square, circular, oval, or, any n-polygonal shape (where n is the number of sides of the polygon). Back skin 106 may be a solid layer (i.e., back skin 106 may be airtight and/or without openings).

In accordance with various embodiments, face skin 108 defines a plurality of slots 120. Stated differently, slots 120 may be formed through face skin 108. In various embodiments, face skin 108 may be formed from a composite material, such as a fiber reinforced composite. The fibers may comprise glass, carbon, ceramic, polymers, or any suitable fiber. The matrix of the fiber reinforced composite may comprise an epoxy, a thermoset material, a thermoplastic material, or any other suitable matrix. In various embodiments, face skin 108 may be a fiberglass reinforced composite with an epoxy matrix. In various embodiments, face skin 108 may be a carbon fiber reinforced composite with an epoxy matrix. In various embodiments, face skin 108 may be a metal or metal alloy, such as aluminum, stainless steel, titanium, or any other desired metal.

Face skin 108, core structure 110, and back skin 106 form resonator chambers and work to attenuate acoustic waves, such as noise from an aircraft engine. The slots 120 in face skin 108 are configured to attenuate an engine's noise by directing the sound into the cells 112 of the core structure 110 to allow reflected noise to destructively interfere with and cancel source noise. The core structure 110 may attenuate sound waves at certain frequency ranges depending on the percent open area (POA) and the dimensions of the slots 120, the height of core structure 110, the volume of the resonator chamber or cell 112, the thickness of the face skin 108, etc.

The size, number, and spacing of slots 120 may be selected based on the acoustic waves and/or airflow characteristics over a particular location of acoustic panel 102. In various embodiments, the POA (i.e., the area of the slots 120 relative to the area of face skin 108) may change at locations where the velocity of the airflow over face skin 108 changes. For example, a location that experiences a greater airflow velocity (i.e., faster airflow) may have a greater POA as compared to a location where the airflow over face skin 108 is slower. In accordance with various embodiments, air may flow along face skin 108 in a direction generally parallel to a first surface 136 of face skin 108.

Figure 3:
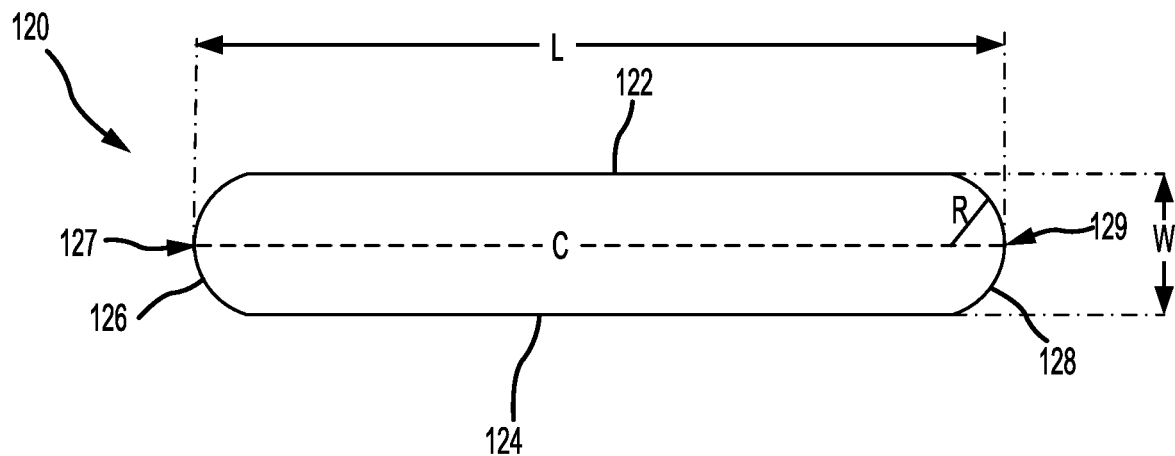
FIG. 3 illustrates an exemplary slot of a face skin for an acoustic panel, in accordance with various embodiments

With reference to FIG. 3, various dimensions of an exemplary slot 120 are illustrated. Slot 120 may be defined by a first planar wall 122 and a second planar wall 124. Second planar wall 124 may be parallel to first planar wall 122. Slot 120 may be further defined by a first semi-circular wall 126 and a second semi-circular wall 128, which is opposite first semi-circular wall 126. First and second semi-circular walls 126, 128 may each extend between first planar wall 122 and second planar wall 124. The curvature of first and second semi-circular walls 126, 128 tends to reduce the stress concentrations along the perimeter of slot 120. For example, rectangular slots or slots having walls that meet at sharp or squared corners (e.g., corners forming 90° angles) tend to experience increased stress at the corners due to the immediate transition from a wall oriented parallel to the flow direction to a wall oriented perpendicular to the flow direction. In contrast, the curved shape of first and second semi-circular walls 126, 128 creates a more gradual transition between the changes in the direction of the slot walls relative to the airflow direction, which tends to reduce variations in the amount of stress experienced along slot 120. Reducing areas of concentrated stress tends to increase the strength of face skin 108.

In various embodiments, a length L of slot 120 may be between 0.01 inches and 1.0 inches (0.25 millimeters (mm) and 25.4 mm). In various embodiments, length L of slot 120 may be between 0.05 inches and 0.5 inches (1.27 mm and 12.7 mm). In various embodiments, length L of slot 120 may be between 0.10 inches and 0.25 inches (2.54 mm and 6.35 mm). Length L is measured between a first end 127 and an opposing second end 129 of slot 120. First end 127 is located on first semi-circular wall 126 at a centerline C of slot 120. Second end 129 is located on second semi-circular wall 128 at centerline C. Centerline C is an imaginary plane locate midway between (i.e., equal distance from) first planar wall 122 and second planar wall 124. Centerline C may be parallel to first planar wall 122 and/or second planar wall 124.

In various embodiments, a width W of slot 120 may be between 0.005 inches and 0.5 inches (0.13 mm and 12.7 mm). In various embodiments, width W of slot 120 may be between 0.01 inches and 0.25 inches (1.27 mm and 6.35 mm). In various embodiments, width W of slot 120 may be between 0.05 inches and 0.10 inches (1.27 mm and 2.54 mm). Width W is measured between first planar wall 122 and second planar wall 124.

In various embodiments, a ratio of length L to width W may be between 1.5:1 and 20:1. In various embodiments, the ratio of length L to width W may be between 2:1 and 10:1. In various embodiments, the ratio of the length L to width W may be between 3:1 and 5:1.

In various embodiments, a ratio of the length L of slot 120 to a radius R of first and second semi-circular walls 126, 128 may be between 1.5:1 and 5:1. In various embodiments, the ratio of length L to radius R may be between 1.5:1 and 10:1, 1.5:1 and 5:1. In various embodiments, the ratio of length L to radius R is about 2:1, wherein in the previous context only, about means±0.2. In various embodiments, a thickness T of face skin 108, with momentary reference to FIG. 2, is less than the length L of slot 120. Thickness T of face skin 108 is measured between opposing first and second surfaces 136, 138 of face skin 108.

In various embodiments, a face skin 108 comprised of aluminum, aluminum alloy, or carbon fiber composite with slots 120 having a width W of approximately 0.05 inches (1.27 mm) may have a thickness T of between approximately 0.02 inches and 0.05 inches (0.51 mm and 1.27 mm), wherein in the previous context only "approximately" means±0.01 inches (0.25 mm). In various embodiments, a face skin 108 comprised of aluminum, aluminum alloy, or carbon fiber composite with slots 120 having a width W of approximately 0.10 inches (2.54 mm) may have a thickness T of between approximately 0.02 inches and 0.10 inches (0.51 mm and 2.54 mm), wherein in the previous context only "approximately" means±0.01 inches (0.25 mm). In various embodiments, a face skin 108 comprised of fiberglass composite with slots 120 having a width W of approximately 0.05 inches (1.27 mm) may have a thickness T of between approximately 0.02 inches and 0.08 inches (0.51 mm and 2.03 mm), wherein in the previous context only "approximately" means±0.01 inches (0.25 mm). In various embodiments, a face skin 108 comprised of fiberglass composite with slots 120 having a width W of approximately 0.10 inches (2.54 mm) may have a thickness T of between approximately 0.02 inches and 0.13 inches (0.51 mm and 3.30 mm), wherein in the previous context only "approximately" means±0.01 inches (0.25 mm).

Figure 4A:
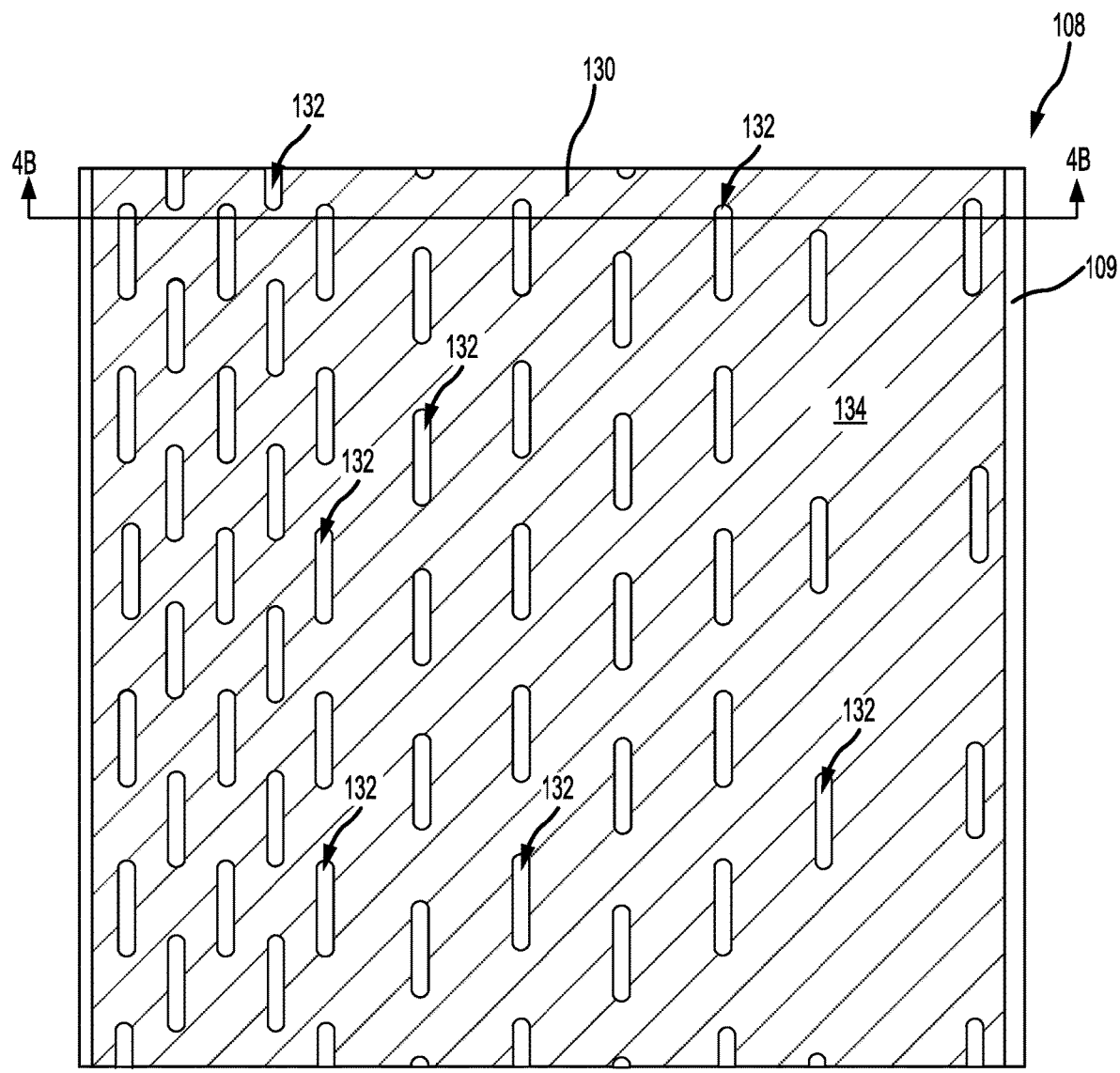
FIGS. 4A, 4B, and 4C illustrate fabrication of a face skin for an acoustic panel, in accordance with various embodiments.
Figure 4B:
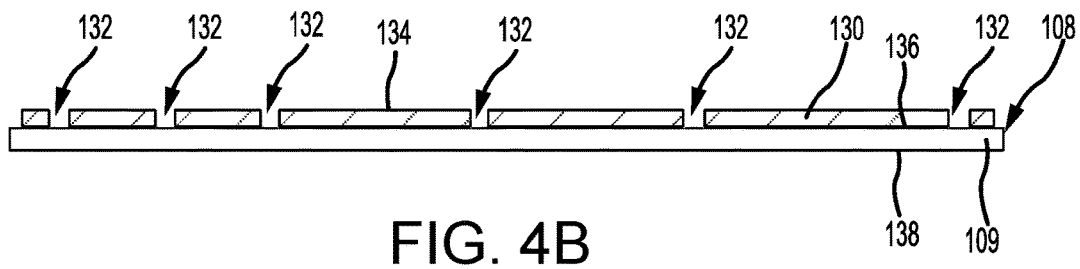
Figure 4C:
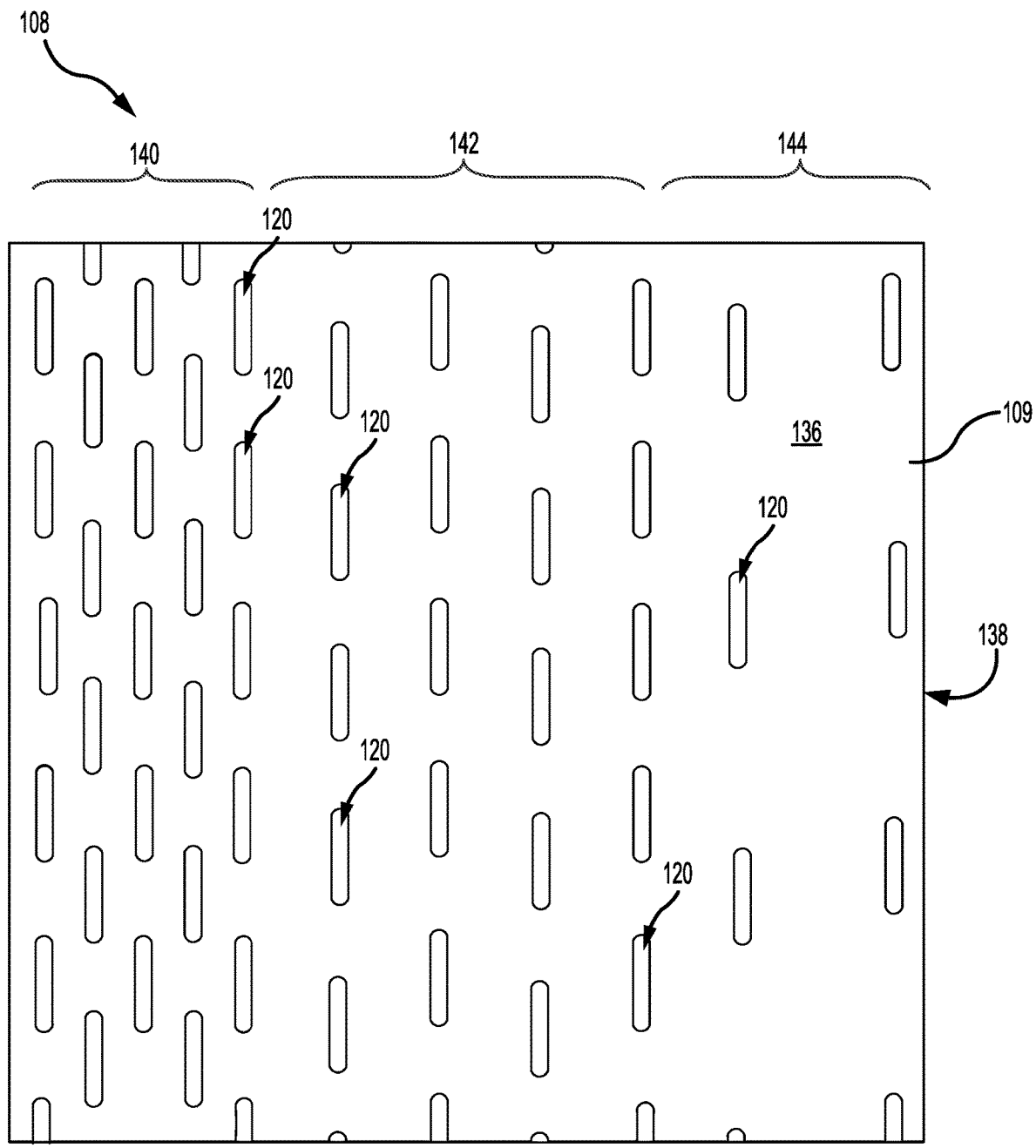

With reference to FIGS. 4A, 4B, and 4C formation of slots 120 in face skin 108 is illustrated. In accordance with various embodiments, slots 120 may be formed in face skin 108 using photomachining. With reference to FIG. 4A, a masking film 130 is located on a sheet 109 configured to form face skin 108. In various embodiments, sheet 109 may be a composite material, such as a fiber reinforced composite (e.g., a fiberglass reinforced composite with an epoxy matrix, a carbon fiber reinforced composite with an epoxy matrix, or any other desired composite). In various embodiments, sheet 109 may be a metal or metal alloy, such as aluminum, stainless steel, titanium, or any other desired metal. Sheet 109 may include first and second surfaces 136, 138.

FIG. 4B illustrates a cross-section view taken along the line 4B-4B in FIG. 4A. With combined reference to FIGS. 4A and 4B, masking film 130 defines a plurality of openings 132. The location, or pattern, of openings 132 corresponds to the desired location and pattern of slots 120. With masking film 130 secured to sheet 109, via for example, adhesive, the surface 134 of masking film 130 and the portions of face skin 108 exposed by openings 132 are blasted with abrasive material (e.g., are sandblasted). In this regard, a stream of abrasive material is propelled against the surface 134 of masking film 130 and the portions of sheet 109 that are exposed by openings 132. The material of masking film 130 is selected such that the abrasive material does not penetrate masking film 130. Masking film 130 may comprise, for example, vinyl, metal, or any other material suitable for sandblasting. The abrasive material contacts the portions of sheet 109 that are exposed by openings 132 in masking film 130. The abrasive material cuts through and/or removes the material of sheet 109 in the portions exposed by openings 132, thereby by forming slots 120 in sheet 109.

FIG. 4C shows sheet 109 after completion of the abrasive blasting. The abrasive blasting continues until slots 120 are formed completely through sheet 109 (i.e., until slots 120 extend from surface 136 to surface 138) and generally have the shape of openings 132. In response to slots 120 being sufficiently formed through sheet 109, masking film 130 is removed. In various embodiments, sheet 109 may be trimmed to the desired dimensions of face skin 108. Face skin 108 is then coupled to core structure 110 in FIG. 2. In various embodiments, the abrasive blasting operation may be performed with sheet 109 (i.e., face skin 108) attached to core structure 110. In various embodiments, erosion coating (e.g., a layer of erosion resistant paint, a fluoroelastomer, or other suitable erosions coating) may be applied to face skin 108.

Figure 5:
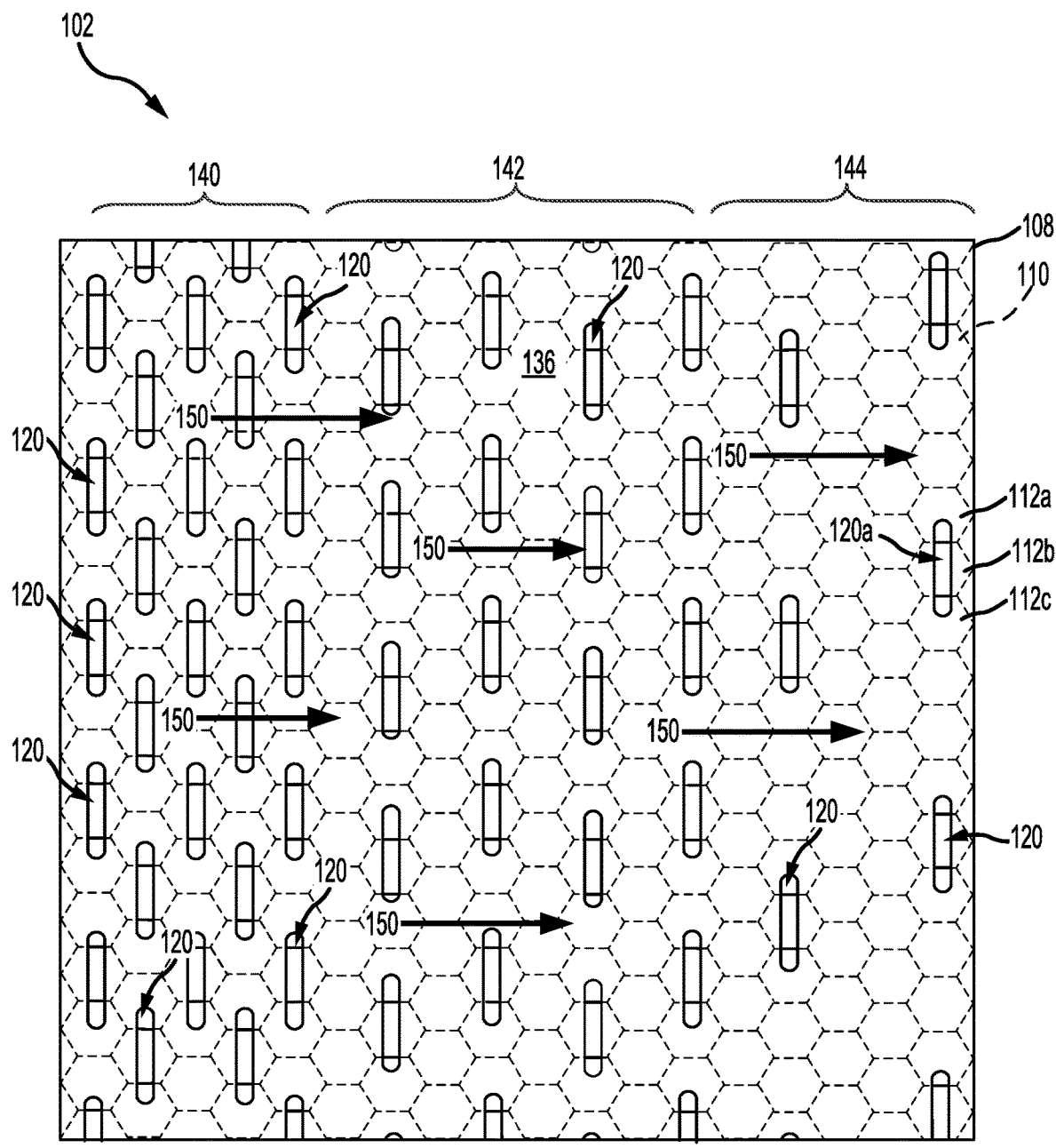
FIG. 5 illustrates the face skin of FIG. 4C located over a core structure of an acoustic panel, in accordance with various embodiments.

FIG. 5 illustrates face skin 108 attached to core structure 110 of acoustic panel 102. Face skin 108 may be coupled to core structure 110 using adhesive, mechanical fasteners, or any other suitable attachment technique. In accordance with various embodiments, the density of slots 120 (i.e., number of slots in a unit of area of face skin surface 136 and/or the POA of face skin surface 136) may be varied across acoustic panel 102. For example, a first region 140 of acoustic panel may have a greater POA as compared to a second region 142 and a third region 144 of acoustic panel 102. In various embodiments, the POA may be modified by changing the number of slots 120 in a particular region. In this regard, first region 140 has a greater number of slots 120 as compared to the number of slots 120 in the same size area in second region 142 and to the number of slots 120 in the same size area in third region 144. Second region 142 may have a greater number of slots 120 and a greater POA, as compared to the same size area in third region 144. In various embodiments, the POA may be modified by changing a size (i.e., area) of the slots.

The POA and the number of slots 120 in a particular region of face skin 108 may be selected based on the velocity of the airflow 150 over that region and/or by the acoustic characteristics experienced in that region. In various embodiments, slots 120 are configured such that length L of slots 120, with momentary reference to FIG. 3, is perpendicular to the direction of airflow 150. In this regard, the orientation of slots 120 may be varied across face skin 108 due to variance in the direction of airflow.

In various embodiments, a single slot 120 may extend over more than one cell 112. For example, slot 120a in FIG. 5 extends over a first cell 112a, a second cell 112b, and a third cell 112c. While each slot 120 in FIG. 5 is illustrated as extending over three cells 112, it is further contemplated and understood that slots 120 may extend over any number of cells 112 based on the desired acoustic dampening desired. In various embodiments, each cell 112 may be associated with only one slot 120. Stated differently, in various embodiments, slots 120 may be configured such that each slot 120 is over a different cell 112 (i.e., no two slots 120 are located over the same cell 112). The configuration of slots 120 over cells 112 and/or the variance in density of slots 120 tends to allow for variability in acoustic dampening and/or may broaden the range of frequencies that may be dampened.

Perforations in acoustic liners can create drag that debits aerodynamic performance of a gas turbine engine. In this regard, slots 120 may be angled with respect to a central longitudinal axis of the gas turbine engine to reduce drag. For example, and with reference to FIG. 6, each slot 120 may be oriented at an angle theta ($\theta$) with respect to the center axis A about which face skin 108 is curved. In various embodiments, center axis A is parallel to the engine central longitudinal axis of the gas turbine engine. As used herein, the terms "axial" and "axially" refer to directions parallel to center axis A, the terms "radial" and "radially" refer to directions toward and away from center axis A, and the terms "circumferential" and "circumferentially" refer to directions about center axis A.

Angle theta ($\theta$) is defined by the centerline C of the slot 120 and central axis A. In various embodiments, angle theta ($\theta$) may be between 0° and 90°. In various embodiments, angle theta ($\theta$) may be between 25° and 75°. In various embodiments, angle theta ($\theta$) may be between 37° to 65°. Angle theta ($\theta$) being less than 90° may orient slots 120 such that second end 129 of second semi-circular wall 128 is axially offset from (e.g., located forward) first end 127 of first semi-circular wall 126. Angle theta ($\theta$) being greater than 0° may orient slots 120 such that second end 129 of second semi-circular wall 128 is circumferentially offset from first end 127 of first semi-circular wall 126.

The angle theta ($\theta$) of slots 120 may vary axially. For example, a slot 120a may be oriented at a first angle theta ($\theta$) and a slot 120b, which is axially off set (e.g., aft) of slot 120a, may be oriented at an angle theta ($\theta$) that is different from the angle theta ($\theta$) of slot 120a. In various embodiments, angle theta $\theta$ may vary circumferentially. For example, slot 120c, which is circumferentially offset from slot 120a, may be oriented at angle theta ($\theta$) that is different from the angle theta ($\theta$) of slot 120a.

Figure 6:
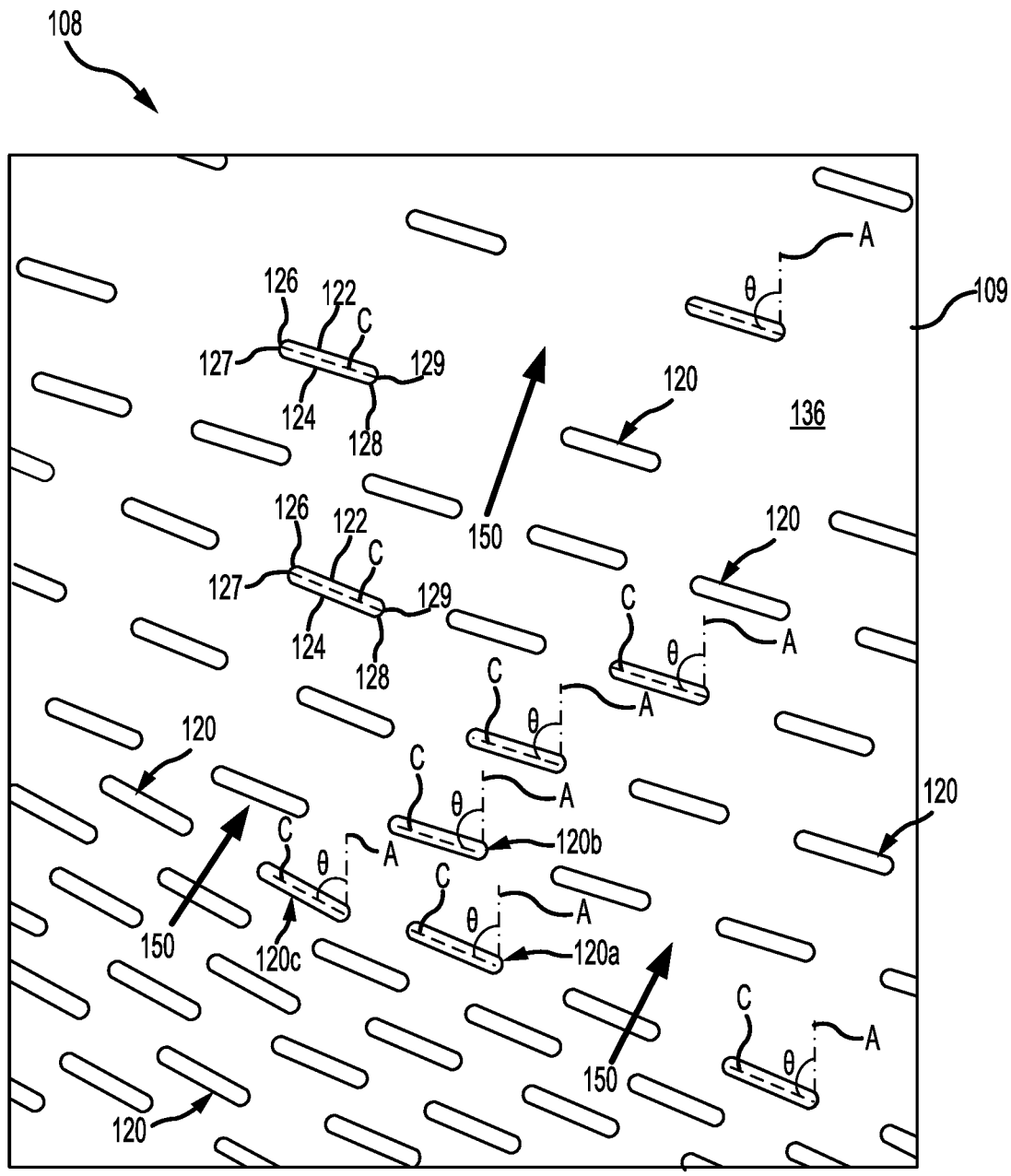
FIG. 6 illustrates a face skin of an acoustic panel, in accordance with various embodiments.

To reduce drag, slots 120 may be oriented such that angle theta ($\theta$0) of each slot 120 is approximately perpendicular to an expected direction of airflow 150 in FIG. 6. In this regard, face skin 108 having slots 120 oriented at varying angles theta ($\theta$) may be employed in locations where the air flows in varying directions, for example, at an inter-stage location between a fan and a fan exit guide vane of a gas turbine engine (i.e., in areas where the flow direction is, at least, partially non-axial and/or angled relative the engine central longitudinal axis).

Figure 7A:
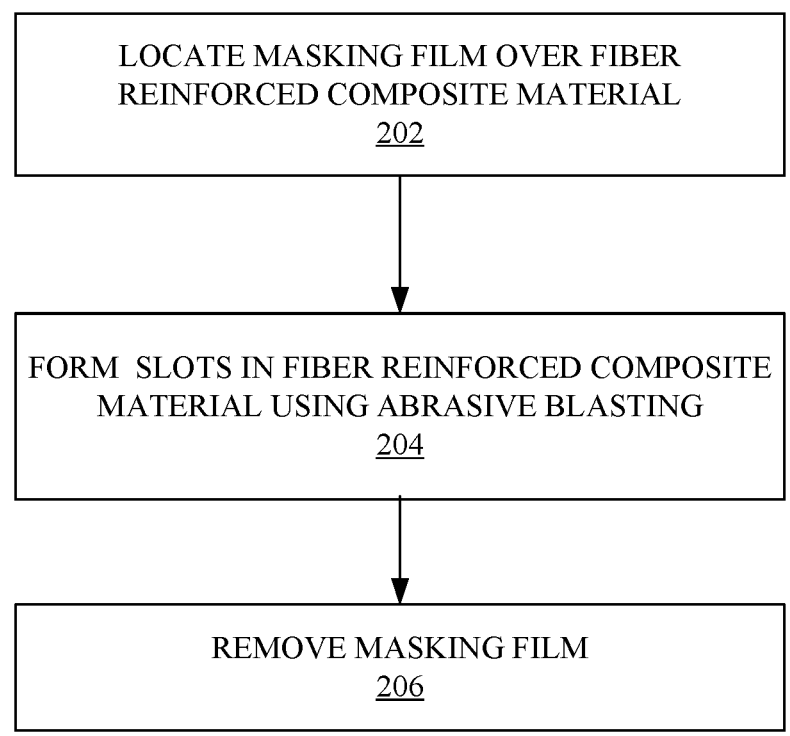
FIGS. 7A and 7B illustrate methods of making a face skin and an acoustic panel, respectively, in accordance with various embodiments.

With reference to FIG. 7A, a method 200 of forming a face skin is illustrated. In accordance with various embodiments, method 200 may include locating a masking film over a sheet (step 202). With combined reference to FIG. 7A and FIG. 4A, step 202 may include locating masking film 130 over sheet 109. In various embodiments, the sheet may be a fiber reinforced composite material. In various embodiments, the sheet may be at least one of a fiberglass reinforced composite material or a carbon fiber reinforced composite material. The masking film may define a plurality of openings. In various embodiments, method 200 may include determining a location and/or pattern of the openings in the masking film based on an airflow velocity experienced by the face skin.

With continued reference to FIG. 7A, method 200 may further include forming a plurality of slots in the sheet using abrasive blasting (step 204) and removing the masking film (step 206). In various embodiments, step 204 may include forming a first region of the sheet having a greater POA as compared to a second region of the sheet. With combined reference to FIG. 7A and FIG. 4C, step 202 may include forming first region 140 of the sheet 109 having a greater POA as compared to a second region 142. In various embodiments, step 204 may include forming the first region 140 having a greater number of slots 120 per unit area as compared to the second region 142. In various embodiments, a density of the slots in the first region is greater than a density of the slots in the second region. In various embodiments, an airflow velocity in the first region 140 is different from an airflow velocity in the second region 142. In various embodiments, step 204 may include forming each slot 120 having a first semi-circular wall and a second semi-circular wall opposite the first semi-circular wall.

Figure 7B:
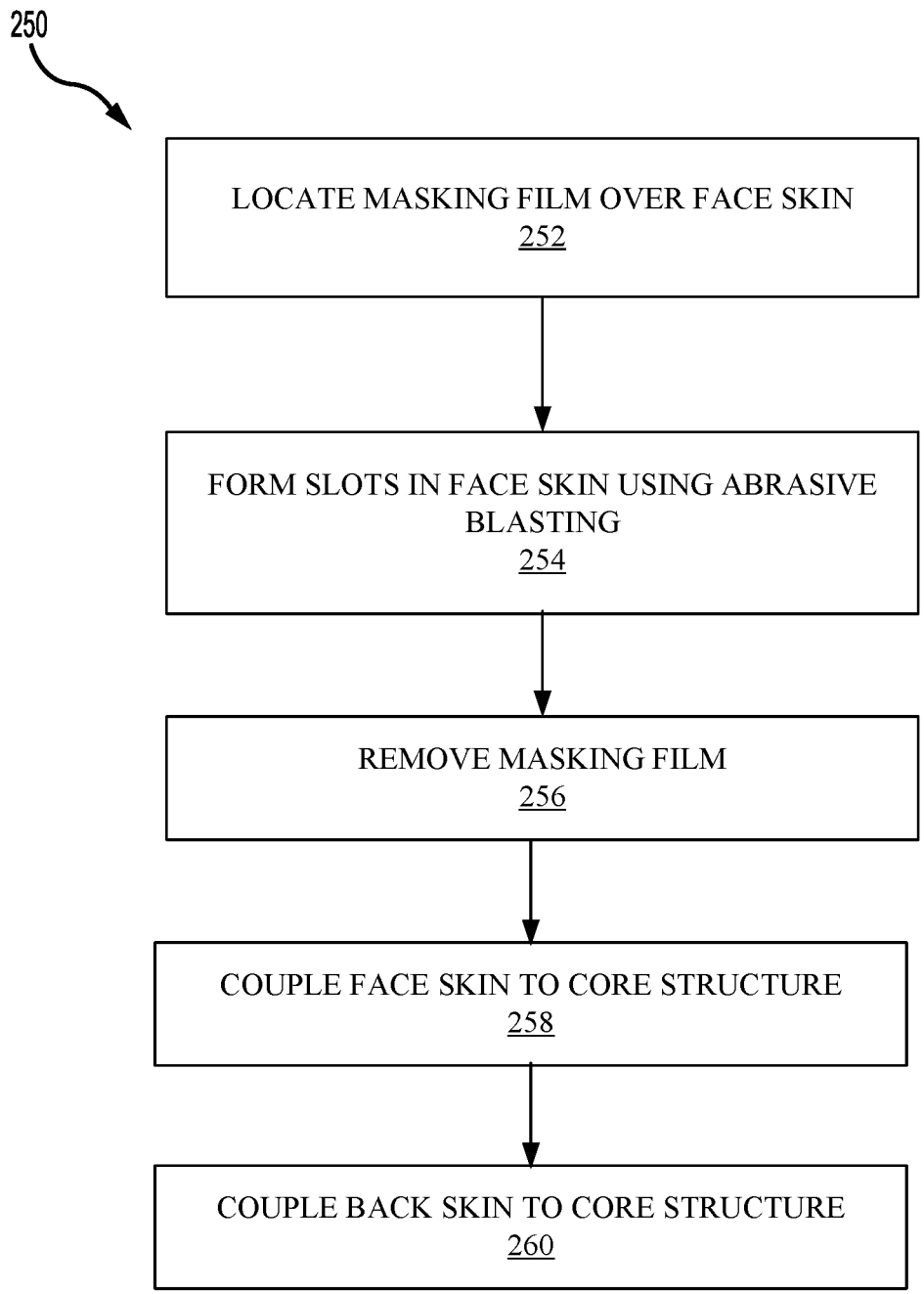

With reference to FIG. 7B, a method 250 of forming an acoustic panel is illustrated. In accordance with various embodiments, method 250 may include locating a masking film over a face skin (step 252). The masking film may define a plurality of openings. In various embodiments, method 200 may include determining a location and/or pattern of the openings in the masking film based on an airflow velocity experienced by the face skin. In various embodiments, the face skin may be a fiber reinforced composite material.

Method 250 may further include forming a plurality of slots in the face skin using abrasive blasting (step 254). In various embodiments, step 254 may include forming a first region of the face skin having a greater POA as compared to a second region of the face skin. In various embodiments, step 254 may include forming the first region of the face skin having a greater number of slots of the plurality of slots per unit area as compared to the second region. In various embodiments, a density of the slots in the first region is greater than a density of the slots in the second region. In various embodiments, an airflow velocity in the first region is different from an airflow velocity in the second region. In various embodiments, step 254 may include forming each slot of the plurality of slots having a first semi-circular wall and a second semi-circular wall opposite the first semi-circular wall.

In various embodiments, method 250 may further include removing the masking film (step 256) and coupling the face skin to a core structure (step 258). In various embodiments, the core structure may define a plurality of cells. In various embodiments, step 258 may include locating the slots over the cells such that each cell is associated with only one slot. In various embodiments, each slot may extend over a plurality of cells.

In various embodiments, method 250 may further include coupling a back skin to the core structure (step 260). In various embodiments, the back skin may comprise a solid or airtight layer. In various embodiments, the back skin may be a fiber reinforced composite material.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method of fabricating a face skin for an acoustic panel of a nacelle configured to surround a central longitudinal axis of a gas turbine engine, the method comprising:

locating a masking film over a first surface of a sheet configured to form the face skin for the acoustic panel of the nacelle and thus, configured to surround the central longitudinal axis of the gas turbine engine, the masking film defining a plurality of openings;

forming a plurality of slots in the sheet using abrasive blasting, wherein each slot of the plurality of slots has a length dimension and a width dimension, the length dimension being greater than the width dimension, and wherein each slot is oriented such that the length dimension is substantially perpendicular to an expected direction of airflow through the gas turbine engine and over the slot, the plurality of slots configured to be oriented at an angle relative to the central longitudinal axis of the gas turbine engine, where the central longitudinal axis is different from the expected direction of airflow through the gas turbine engine, wherein the angle is defined by a centerline of each slot of the plurality of slots and the central longitudinal axis, wherein a first end of a first semi-circular wall of at least one first slot in the plurality of slots through the face skin is at least one of axially offset or circumferentially offset from a second end of a second semi-circular wall of the at least one first slot though the face skin based upon a degree of a first angle, wherein a first end of a first semi-circular wall of at least one second slot in the plurality of slots through the face skin is at least one of axially offset or circumferentially offset from a second end of a second semi-circular wall of the at least one second slot though the face skin based upon a degree of a second angle, wherein the first angle is different from the second angle, wherein the plurality of slots in the sheet comprises forming at least three regions with a first region of the sheet having a first percentage of open area and a first number of slots that is greater than a second percentage of open area and a second number of slots in a second region of the sheet and greater than a third percentage of open area and a third number of slots in a third region of the sheet, wherein the second percentage of open area and the second number of slots in the second region of the sheet is greater than the third percentage of open area and the third number of slots in the third region of the sheet, and wherein a percentage of open area and a number of slots in each of the first region, the second region and the third region is selected based on an expected velocity of the airglow over a respective region and acoustic characteristics experienced in the respective region; and wherein the first number of slots is offset from the second number of slots; and removing the masking film.

2. The method of claim 1, further comprising determining a pattern of the plurality of openings in the masking film based on an airflow velocity experienced by the face skin.

3. The method of claim 1, wherein an expected airflow velocity in the first region is different from the airflow velocity in the second region.

4. The method of claim 3, wherein the sheet comprises a fiber reinforced composite that is at least one of a fiberglass reinforced composite and a carbon fiber reinforced composite, the fiber reinforced composite includes at least one of glass, carbon, ceramic, and a polymer, the fiber reinforced composite includes a matrix with at least one of a thermoset material and a thermoplastic material.

5. The method of claim 4, further comprising forming each slot of the plurality of slots having:
   a first planar wall;
   a second planar wall oriented toward the first planar wall;
   a first semi-circular wall extending between the first planar wall and the second planar wall; and
   a second semi-circular wall opposite the first semi-circular wall and extending between the first planar wall and the second planar wall, wherein a centerline of the slot is substantially perpendicular to the expected flow direction over the slot, the centerline being located midway between the first planar wall and the second planar wall and extending from the first semi-circular wall to the second semi-circular wall.

6. The method of claim 1, wherein the first slots of the plurality of slots are configured to be oriented at a first angle relative to the central longitudinal axis of the gas turbine engine, wherein second slots of the plurality of slots are configured to be oriented at a second angle relative to the central longitudinal axis of the gas turbine engine, and wherein the first angle is different from the second angle.

7. A method of fabricating an acoustic panel for a gas turbine engine, comprising:
   locating a masking film over a face skin of the acoustic panel configured to surround a central longitudinal axis of the gas turbine engine, the masking film defining a plurality of openings;
   forming a plurality of slots in the face skin using abrasive blasting, wherein each slot of the plurality of slots has a first dimension and a second dimension, the first dimension being greater than the second dimension, and wherein each slot is oriented such that the first dimension of the slot is substantially perpendicular to an expected direction of airflow through the gas turbine engine and over the slot, the plurality of slots configured to be oriented at an angle relative to the central longitudinal axis of the gas turbine engine, where the central longitudinal axis is different from the expected direction of airflow through the gas turbine engine, wherein the angle is defined by a centerline of each slot of the plurality of slots and the central longitudinal axis, wherein a first end of a first semi-circular wall of at least one first slot in the plurality of slots through the face skin is at least one of axially offset or circumferentially offset from a second end of a second semi-circular wall of the at least one first slot though the face skin based upon a degree of a first angle, wherein a first end of a first semi-circular wall of at least one second slot in the plurality of slots through the face skin is at least one of axially offset of circumferentially offset from a second end of a second semi-circular wall of the at least one second slot though the face skin based upon a degree of a second angle, wherein the first angle is different from the second angle, wherein the plurality of slots in the face skin comprises forming at least three regions with a first region of the face skin having a first percentage of open area and a first number of slots that is greater than a second percentage of open area and a second number of slots in a second region of the face skin and greater than a third percentage of open area and a third number of slots in a third region of the face skin, wherein the second percentage of open area and the second number of slots in the second region of the face skin is greater than the third percentage of open area and the third number of slots in the third region of the face skin, and wherein a percentage of open area and a number of slots in each of the first region, the second region and the third region is selected based on an expected velocity of the airflow over a respective region and acoustic characteristics experienced in the respective region; and wherein the first number of slots is offset from the second number of slots; and coupling the face skin to a core structure, the core structure defining a plurality of cells, wherein the face skin and the core structure are curved such that the face skin and the core structure surround, at least partially, the central longitudinal axis of the gas turbine engine.

8. The method of claim 7, further comprising:
   removing the masking film; and
   coupling a back skin to the core structure opposite the face skin, wherein the back skin is a solid layer.

9. The method of claim 7, further comprising determining a pattern of the plurality of openings in the masking film based on an airflow velocity experienced by the face skin.

10. The method of claim 7, wherein the face skin comprises a fiber reinforced composite that is at least one of a fiberglass reinforced composite and a carbon fiber reinforced composite, the fiber reinforced composite includes at least one of glass, carbon, ceramic, and a polymer, the fiber reinforced composite includes a matrix with at least one of a thermoset material and a thermoplastic material.

11. The method of claim 7, wherein the acoustic panel forms, at least, a portion of a nacelle configured to the surround the gas turbine engine.

12. The method of claim 7, wherein the acoustic panel forms, at least, a portion of at least one of an inner inlet barrel, an inner fixed structure of a thrust reverser, a translating sleeve of a translating sleeve type thrust reverser, or an exhaust system for the gas turbine engine.

13. The method of claim 7, wherein the acoustic panel is configured to form, at least, a portion of at least one of an inner inlet barrel, an inner fixed structure of a thrust reverser, a translating sleeve of a translating sleeve type thrust reverser, or an exhaust system for the gas turbine engine.

14. The method of claim 7, wherein first slots of the plurality of slots are configured to be oriented at a first angle relative to the central longitudinal axis of the gas turbine engine, wherein second slots of the plurality of slots are configured to be oriented at a second angle relative to the central longitudinal axis of the gas turbine engine, and wherein the first angle is different from the second angle.

\* \* \* \* \*